United States Patent
Katou et al.

(10) Patent No.: US 6,304,172 B1
(45) Date of Patent: Oct. 16, 2001

(54) RECEIVER OF TIRE INFLATION PRESSURE MONITOR

(75) Inventors: Michiya Katou, Ichinomiya; Kazunori Sawafuji, Ogaki; Akira Momose, Hashima, all of (JP)

(73) Assignee: Pacific Industrial Co., Ltd. (JP)

( * ) Notice: Subject to any disclaimer, the term of this patent is extended or adjusted under 35 U.S.C. 154(b) by 0 days.

(21) Appl. No.: 09/442,706

(22) Filed: Nov. 18, 1999

(30) Foreign Application Priority Data

Nov. 27, 1998 (JP) .................................................. 10-336656
Dec. 17, 1998 (JP) .................................................. 10-358315

(51) Int. Cl.⁷ .................................................. B60C 23/00
(52) U.S. Cl. .......................... 340/445; 73/146.5; 340/447
(58) Field of Search .................................... 340/442, 445, 340/447, 448, 443, 444, 446; 73/146.4, 146.5; 200/61.23, 61.25; 343/713, 728; 116/34 R

(56) References Cited

U.S. PATENT DOCUMENTS

| | | | |
|---|---|---|---|
| 3,329,934 | * 7/1967 | Wooden | 340/447 |
| 3,873,965 | * 3/1975 | Garcia | 340/447 |
| 4,237,728 | * 12/1980 | Betts et al. | 340/447 |
| 4,319,220 | * 3/1982 | Pappas et al. | 200/61.23 |
| 4,609,905 | * 9/1986 | Uzzo . | |
| 4,970,491 | * 11/1990 | Saint et al. | 340/447 |
| 4,978,941 | * 12/1990 | Brown | 340/442 |
| 5,774,047 | * 6/1998 | Hensel, IV | 340/442 |
| 5,900,808 | * 5/1999 | Lebo | 340/442 |

FOREIGN PATENT DOCUMENTS 2-74204   6/1990   (JP) .

* cited by examiner

*Primary Examiner*—Brent A. Swarthout
(74) *Attorney, Agent, or Firm*—Madson & Metcalf

(57) ABSTRACT

A tire inflation pressure monitor includes wheel transmitters and a receiver. The wheel transmitters transmit tire inflation pressure data by radio waves, and the receiver receives the data from the transmitters. The receiver includes reception antennas for receiving radio waves from the transmitters and a receiver unit for processing the received data. The reception antennas include external reception antennas, which are separated from the receiver unit, and at least one internal reception antenna, which is located in the receiver unit. The number of the external reception antennas is less than that of the transmitters by one. As a result, the receiver is simplified without reducing its performance. Also, a loop antenna, which is used as a reception antenna to induce voltage by the magnetic field component of radio waves, improves the efficiency of the receiver.

20 Claims, 3 Drawing Sheets

RECEIVER OF TIRE INFLATION PRESSURE MONITOR

BACKGROUND OF THE INVENTION

The present invention relates to a tire inflation monitor for vehicles. More specifically, the present invention relates to a receiver for receiving tire inflation pressure data transmitted by a wireless transmitter located in a tire.

Wireless tire inflation pressure monitors have been proposed so that the tire inflation pressures of tires of a vehicle can be checked in the passenger compartment. The monitor includes transmitters attached to the wheels and a receiver located in the body of the vehicle. Each transmitter measures a tire inflation pressure of a corresponding tire and performs wireless transmission of data including the measured inflation pressure data. The receiver receives the data from each transmitter and displays information concerning tire inflation pressure of each tire on a display, which is located, for example, in front of the driver's seat.

A typical vehicle having four tires includes four transmitters corresponding respectively to the tires. The output strength of radio waves from each transmitter is limited by local communications laws and cannot be greatly increased. The receiver has four reception antennas that respectively correspond to the four transmitters, to ensure reception of weak radio waves from the transmitters. The reception antennas are located in the vicinity of the tires, which have the built-in transmitters, for example, in or near the fenders (cf. Japanese Unexamined Utility Model Publication No. 2-74204). The receiver receives the weak radio waves from the transmitters through the corresponding reception antennas.

A receiver unit is located in the passenger compartment or the trunk. The reception antennas are located apart from the receiver unit and are connected to the receiver unit through cables. Therefore, the wiring between the receiver unit and the reception antennas is complicated. This complicates the entire system and the cost of the monitor.

The reception antennas described in the above Publication No. 2-74204 are arcuate wire antennas, which extend along the fenders. Each wire antenna induces voltage mainly by an electric field component of radio waves. However, most vehicle bodies have metal fenders, which are likely to influence the electric field component of radio waves. The electric field component of radio waves attenuates in the vicinity of metal materials. Therefore, the wire antennas attached to the fenders cannot efficiently receive radio waves from the transmitters.

To improve the efficiency of receiving radio waves, each wire antenna must be separated from the metal surface of the corresponding fender as much as possible. However, if the distance between a wire antenna and the metal surface is varied even slightly, the performance of the wire antenna varies greatly. This makes it difficult to maintain the quality of the monitor. Also, when one of the wire antennas is separated from the metal surface of the corresponding fender, the wire antenna may interfere with the corresponding tire.

The length of each wire antenna may be increased to improve the efficiency of receiving radio waves. However, his increases the size of the wire antennas and is not desirable.

SUMMARY OF THE INVENTION

An objective of the present invention is to provide a receiver of a tire inflation pressure monitor that simplifies the entire system.

Another objective of the present invention is to provide a receiver of a tire inflation pressure monitor that improves the efficiency of receiving radio wave.

To achieve the above objectives, the present invention provides a receiver located in a body of a vehicle for receiving tire inflation pressure data transmitted by radio waves from a plurality of transmitters. The receiver includes a plurality of reception antennas for receiving the radio waves from the transmitters and a unit for processing the received data. The reception antennas include at least one external reception antenna, which is separated from the unit, and at least one internal reception antenna, which is located in the unit.

The present invention further provides a receiver located in a vehicle body for receiving tire inflation pressure data transmitted from a transmitter by radio waves. The receiver includes a reception antenna for receiving radio waves from the transmitter. The reception antenna is a loop antenna, which induces voltage based on a magnetic field component of radio waves.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire inflation pressure monitor according to one embodiment of the present invention will now be described with reference to the FIGS.

Figure 1:
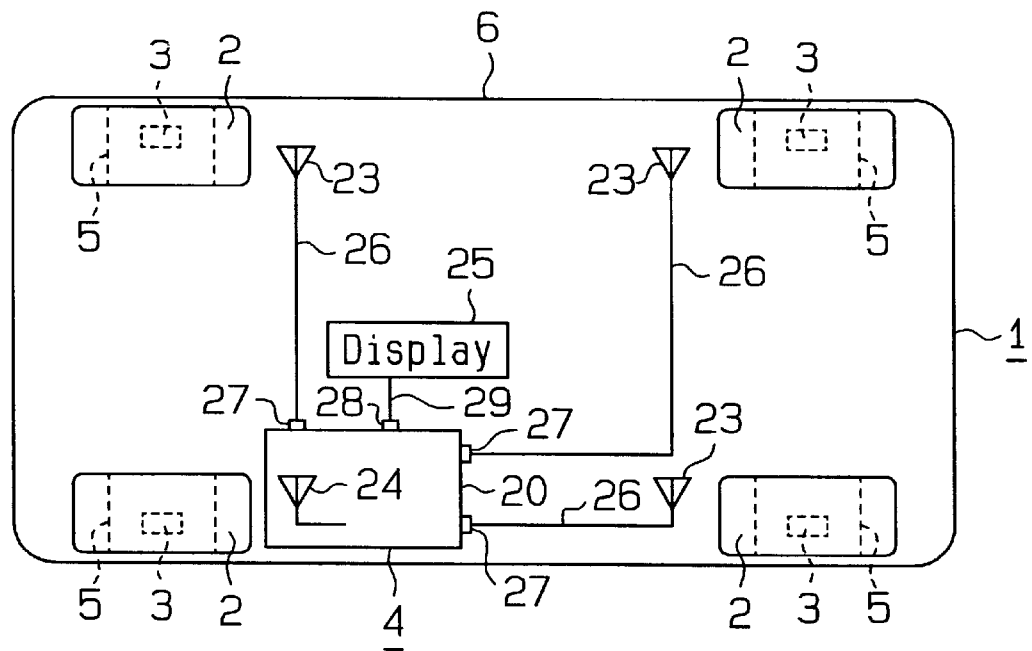
FIG. 1 is a diagrammatic view of a tire inflation pressure monitor according to one embodiment of the present invention.

As shown in FIG. 1, a tire inflation pressure monitor includes four transmitters 3 and a receiver 4. The transmitters 3, which are located in the four tires 2 of a vehicle 1, respectively, are fixed to the corresponding wheels 5. The receiver 4, which is located in a vehicle body 6 of the vehicle 1, includes three external reception antennas 23 and one internal reception antenna 24. The three external reception antennas 23 correspond to three of the four transmitters 3, and the internal reception antenna 24 corresponds to the remaining transmitter 3.

Each transmitter 3 measures the internal air pressure of the corresponding tire 2 and performs wireless transmission of data including data representing the measured pressure. The receiver 4 receives the data from the transmitters 3 mainly through the corresponding antennas 23, 24. All the transmitters are identical, therefore, only one transmitter will be described for simplifying the description.

Figure 2:
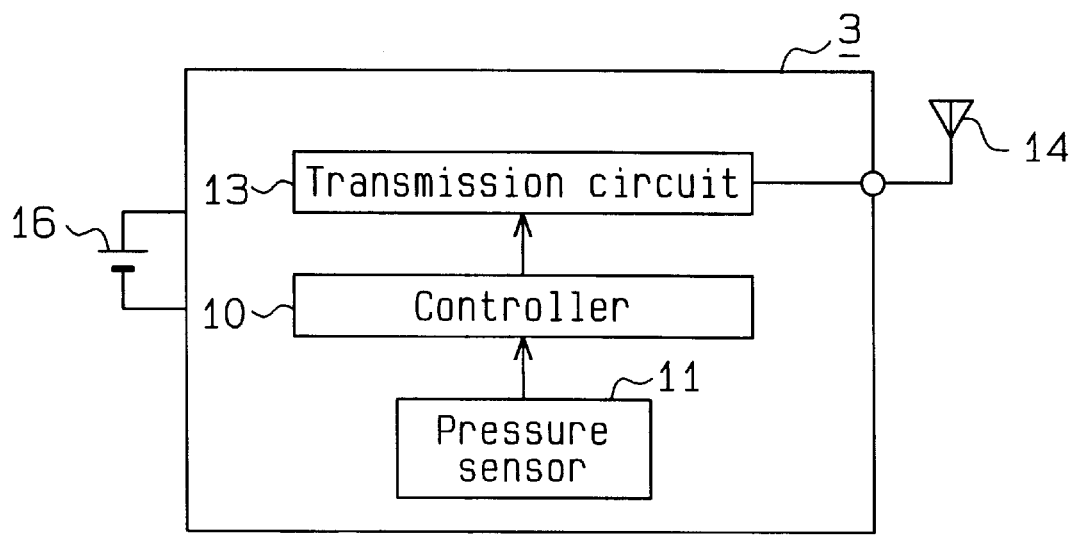
FIG. 2 is a block circuit view showing the transmitter of the monitor of FIG. 1.

As shown in FIG. 2, the transmitter 3 includes a controller 10, which is a kind of microcomputer. The controller 10 includes, for example, a central processing unit (CPU), a random access memory (RAM), and a read only memory (ROM). A unique ID code is registered in an internal memory of the controller 10, for example, in the ROM in advance. The ID code is used to distinguish each transmitter 3 from the other transmitters 3.

A pressure sensor 11 measures the internal air pressure of the corresponding tire 2 and sends the pressure data to the controller 10. The controller 10 sends data including the pressure data and the ID code to a transmission circuit 13. The transmission circuit 13 encodes and demodulates the data from the controller 10 and wirelessly transmits the data through a transmission antenna 14.

A battery 16 powers the transmitter 3. The transmitter 3 is operated by electric power from the battery 16.

Figure 3:
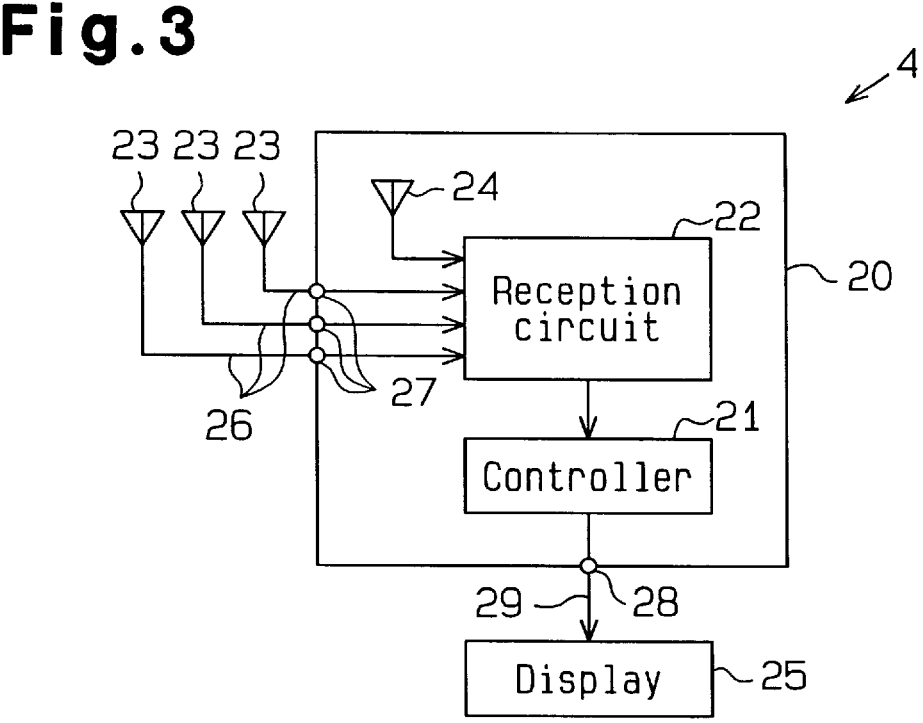
FIG. 3 is a block circuit view showing the receiver of the monitor of FIG. 1.

A receiver 4 shown in FIG. 1 and 3 is powered by, for example, a battery (not shown) of the vehicle 1. The receiver 4 includes a receiver unit, or main body 20, which is located at a predetermined location on the vehicle 1, that is, in the vicinity of one of the tires 2. The internal reception antenna 24 is located in the main body 20 and near a corresponding one of the tires 2. The external reception antennas 23 are separated from the main body 20 and are located near corresponding tires 2.

The main body 20 includes three input terminals 27. The external reception antennas 23 connected to the input terminals 27 respectively through cables 26. The cables 26 are preferably coaxial cables. A display 25 is located in a visible range of the driver in the vehicle 1. The display 25 is connected to an output terminal 28 of the main body 20 by a cable 29.

As shown in FIG. 3, the main body 20, which processes received data, includes a controller 21 and a reception circuit 22 in addition to the internal reception antenna 24. The controller 21, which is a kind of a microcomputer, includes, for example, a CPU, a RAM, and a ROM. The reception circuit 22 receives data from the transmitters 3 mainly through the corresponding reception antennas 23, 24. The reception circuit 22 also sends data to the controller 21 after demodulating and decoding the received data.

The controller 21 judges the internal air pressure of the tires 2 based on the received data. The controller 21 also commands a display 25 to display information including tire inflation pressure. The display 25 may warn of an abnormality in the tire inflation pressures.

The receiver 4 includes the three external reception antennas 23, which correspond to three of the transmitters 3, and the internal reception antenna 24, which corresponds to one of the transmitters 3. Therefore, only three reception antennas 23 need to be connected to the main body 20 of the receiver 4, which reduces the number of reception antennas that have to be connected to the main body 20 through the cables 26. In other words, the number of the reception antennas 23 is less than the number of the transmitters 3 attached to the vehicle 1.

Compared to the prior art receiver, in which the number of the external reception antennas is the same as that of the transmitters attached to the vehicle, the wiring between the main body 20 and the external reception antennas 23 is simplified. Furthermore, the main body 20 needs only three input terminals 27 for the external reception antennas 23, which simplifies the structure of the main body 20. As a result, the entire system of the monitor is simplified, which reduces costs.

Although the number of the external reception antennas 23 is smaller than that of the transmitters 3, the performance of the receiver 4 is equal to that of the prior art receiver.

Actually, each reception antenna 23, 24 receives radio waves from not only the corresponding transmitter 3 but also from the other transmitters 3. Therefore, the number of external reception antennas 23 can be reduced. Even if the number of external reception antennas 23 is less than three, radio waves from the four transmitters 3 can be received by each antenna 23, 24, depending on various conditions that include the size of the vehicle 1 and the installation environment of the antennas 23, 24. If the number of the external reception antennas 23 is less than three, the structure of the monitor is further simplified.

As another example, the number of internal reception antennas 24 may be two or more and the number of the external reception antennas 23 may be two or less.

Figure 4:
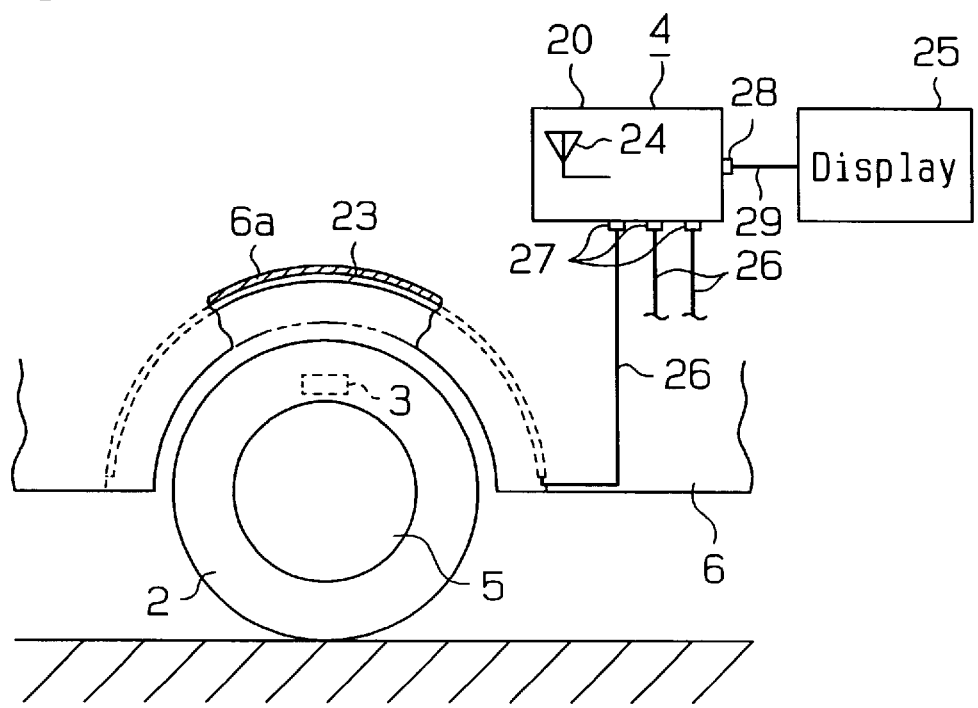
FIG. 4 is a schematic view showing one example of the reception antenna in the receiver of FIG. 3.

FIG. 4 shows exemplary external reception antennas 23, which are wire antennas. Each reception antenna 23, or each wire antenna 23, extends along the arcuate surface of the corresponding fender 6a of the vehicle 6. Accordingly, each wire antenna 23 faces the tire 2 in the corresponding fender 6a.

As described in the previous BACKGROUND OF THE INVENTION section, each wire antenna 23 induces voltage by an electric field component of radio waves. However, most of the vehicle, including the fenders 6a, is metal, which attenuates the electric field component of radio waves. Therefore, the wire antennas 23 may be separated from the metal surfaces of the fenders 6a.

Figure 5:
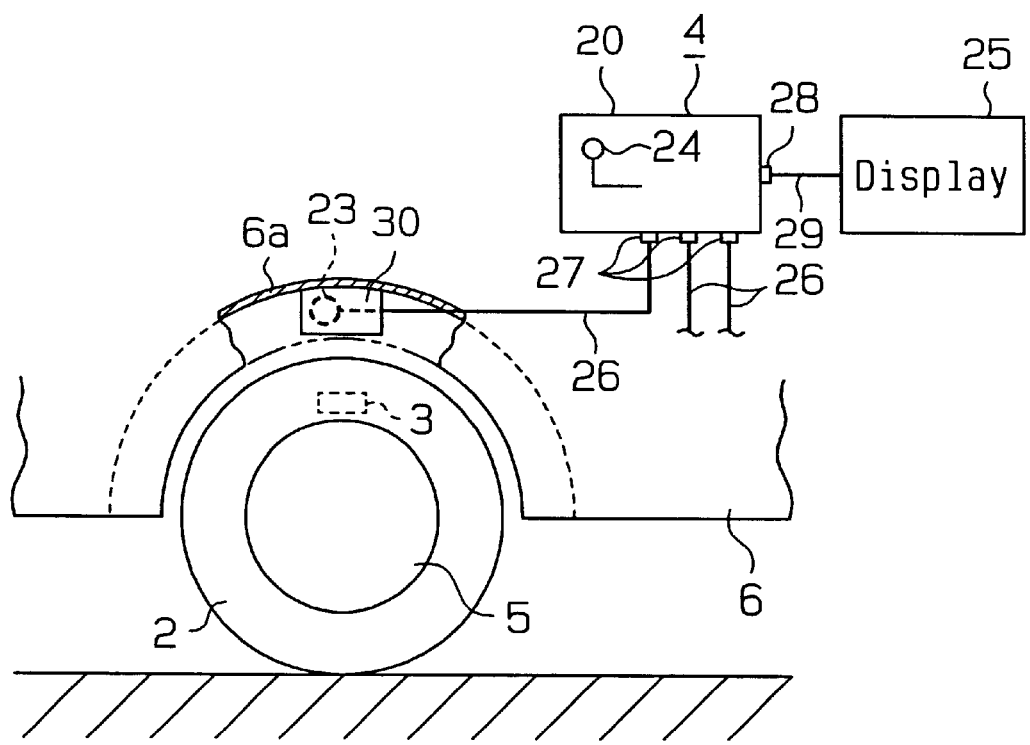
FIG. 5 is a schematic view showing another example of the reception antenna in the receiver of FIG. 3.

FIG. 5 shows an external reception antenna 23 and an internal reception antenna 24, which are magnetic field type loop antennas. Each external loop antenna 23 is accommodated in a case 30 made of an insulator and is attached to the surface of the corresponding fender 6a of the vehicle 6. In other words, each loop antenna 23 is installed through the insulator 30 to face the corresponding tire 2. The internal loop antenna 24 is located in the main body 20 near the corresponding tire 2 (fender 6a).

The loop antennas 23, 24 induce voltage mainly by a magnetic field component of radio waves. Unlike an electric field component, a magnetic field component is likely to be amplified by metal. Therefore, the external loop antennas 23 attached to the metal fenders 6a efficiently receive radio waves from the transmitters 3.

It has been proven by experiments that the value of the voltage induced by one of the wire antennas 23 of FIG. 4 is different from that induced by one of the loop antennas 23 of FIG. 5. According to the experiments, the voltage induced by the loop antenna 23 was greater than that induced by the wire antenna 23 by the degree of 8 dB $\mu V$.

The loop antennas 23, 24 of FIG. 5 are manufactured using printed boards. This permits high quality mass production of the antennas 23, 24 and reduces manufacturing costs.

The wire antennas 23 of FIG. 4 and the loop antennas 23 of FIG. 5 are attached near the fenders 6a but may be attached to other parts of the vehicle 6 or in the vicinity of the fenders 6a as long as good reception of radio waves is possible.

The present examples and embodiments are to be considered as illustrative and not restrictive and the invention is not to be limited to the details given herein, but may be modified within the scope and equivalence of the appended claims.

What is claimed is:

1. A receiver located in a body of a vehicle for receiving tire inflation pressure data transmitted by radio waves from a plurality of transmitters, wherein the receiver includes a plurality of reception antennas for receiving the radio waves from the transmitters and a unit for processing the received data, the reception antennas comprising:

at least one external reception antenna, which is separated from the unit, wherein each external reception antenna corresponds to at least one of the transmitters; and at least one internal reception antenna, which is located in the unit, wherein each internal reception antenna corresponds to the remaining transmitter or transmitters.

2. The receiver according to claim 1 further including a cable for connecting the external reception antenna to the unit.

3. The receiver according to claim 1 further including a display connected to the unit for displaying information concerning tire inflation pressure.

4. The receiver according to claim 1, wherein the external reception antenna is a loop antenna that induces voltage based on a magnetic field component of radio waves.

5. The receiver according to claim 4, wherein the loop antenna is attached to the vehicle with an insulator.

6. The receiver according to claim 5, wherein the insulator forms a case for accommodating the loop antenna.

7. The receiver according to claim 1, wherein the internal reception antenna is a loop antenna that induces voltage based on a magnetic field component of radio waves.

8. The receiver according to claim 1, wherein the vehicle includes a plurality of tires, wherein each of the transmitters is installed in one of the tires, wherein the total number of the external and internal reception antennas is the same as or less than that of the transmitters.

9. The receiver according to claim 8, wherein the vehicle body includes a plurality of fenders respectively housing the tires, wherein the external reception antenna is located in or near one of the fenders, and the internal reception antenna is located near a corresponding one of the fenders.

10. The receiver according to claim 8, wherein the number of the external reception antennas is smaller than the number of the transmitters by one, and there is one internal reception antenna.

11. The receiver according to claim 1, wherein the vehicle includes a plurality of tires, wherein each of the transmitters is installed in one of the tires, wherein the total number of external and internal reception antennas is the same as that of the transmitters.

12. The receiver according to claim 11, wherein the vehicle body includes a plurality of fenders respectively housing the tires, wherein at least one external reception antenna is located in or near one of the fenders, and at least one internal reception antenna is located near a corresponding one of the fenders.

13. The receiver according to claim 12, wherein the number of external reception antennas is smaller than the number of the transmitters by one, and there is one internal reception antenna.

14. A receiver located in a body of a vehicle for receiving tire inflation pressure data transmitted by radio waves from a plurality of transmitters, wherein the receiver includes a plurality of reception antennas for receiving the radio waves from the transmitters and a unit for processing the received data, the reception antennas comprising:

at least one external reception antenna, which is separated from the unit; and at least one internal reception antenna, which is located in the unit, wherein the number of the tires is four and the number of the transmitters is four, wherein each of the transmitters is installed in one of the tires, wherein the external reception antennas correspond respectively to three of the tires, and the internal reception antenna corresponds to the remaining tire.

15. A tire inflation pressure monitor including a plurality of transmitters located respectively in proximity to the tires of a vehicle for transmitting tire inflation pressure data by radio waves and including a receiver located in a vehicle body for receiving data from the transmitters, the receiver comprising:

a unit for processing the received data; and a plurality of reception antennas for receiving radio waves from the transmitters, the reception antennas including:

a plurality of external reception antennas, which are separated from the unit, wherein the number of the external reception antennas is smaller than that of the transmitters, and wherein each of the external reception antennas corresponds to at least one of the transmitters; and one internal reception antenna, which is located in the unit, wherein the internal reception antenna corresponds to the remaining transmitter or transmitters.

16. The monitor according to claim 15, wherein each external reception antenna is a loop antenna, which induces voltage based on a magnetic field component of radio waves.

17. The monitor according to claim 16, wherein each loop antenna is encased by an insulator when installed on the vehicle body.

18. The monitor according to claim 15, wherein the internal reception antenna is a loop antenna, which induces voltage based on a magnetic field component of the radio waves.

19. The receiver according to claim 15, wherein the vehicle includes a plurality of tires, wherein each of the transmitters is installed in one of the tires, wherein the total number of external and internal reception antennas is the same as that of the transmitters.

20. The receiver according to claim 19, wherein the vehicle body includes a plurality of fenders respectively housing the tires, wherein at least one external reception antenna is located in or near one of the fenders, and the internal reception antenna is located near a corresponding one of the fenders.

* * * * *